June 5, 1934. F. J. HINDERLITER Re. 19,196

TOOL JOINT FOR ROTARY DRILLS

Original Filed Jan. 13, 1930

INVENTOR
Frank J. Hinderliter
BY
Arthur C. Brown
ATTORNEY

Reissued June 5, 1934

Re. 19,196

UNITED STATES PATENT OFFICE 19,196

TOOL JOINT FOR ROTARY DRILLS

Frank J. Hinderliter, Tulsa, Okla.

Original No. 1,938,255, dated December 5, 1933, Serial No. 420,419, January 13, 1930. Renewed December 10, 1931. Application for reissue April 13, 1934, Serial No. 720,493

REISSUED

17 Claims. (Cl. 285—146)

My invention relates to tool joints, and more particularly to a device of that character for coupling the sections of drill pipe employed in rotary well drilling equipment.

In rotary drilling the bit is suspended in the well hole on a tubular rod, known as drill pipe and formed in sections which are connected by coupling devices known as tool joints, to provide a continuous passage through which mud-laden fluid is delivered for cleaning the bit, softening the formation and flushing the drillings from the well hole. The fluid, being delivered through the pipe under high pressure, is inclined to seek outlet through the joints and when a leak occurs the fine sand carried in suspension in the fluid grinds the metal over which it flows and rapidly eats away the wall of the joint, short circuiting the fluid and thus interfering with the drilling operation.

It is the object of my invention to obviate such interference with the drilling operation and the loss incident to such damage to the equipment by sealing the pipe sections in the joints to prevent initial escape of fluid at the joints and thus obviate the destructive effects resulting from continued leakage.

In accomplishing this and other objects of the invention, I have provided improved details of structure, the preferred form of which is illustrated in the accompanying drawing, wherein.

Figure 1:
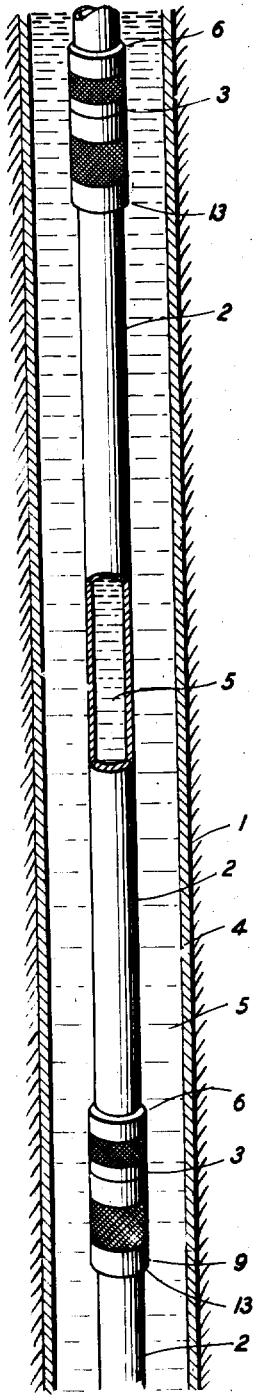
Fig. 1 is a vertical section of part of a well hole, being formed with equipment including drill pipe and tool joints embodying my invention.
Figure 2:
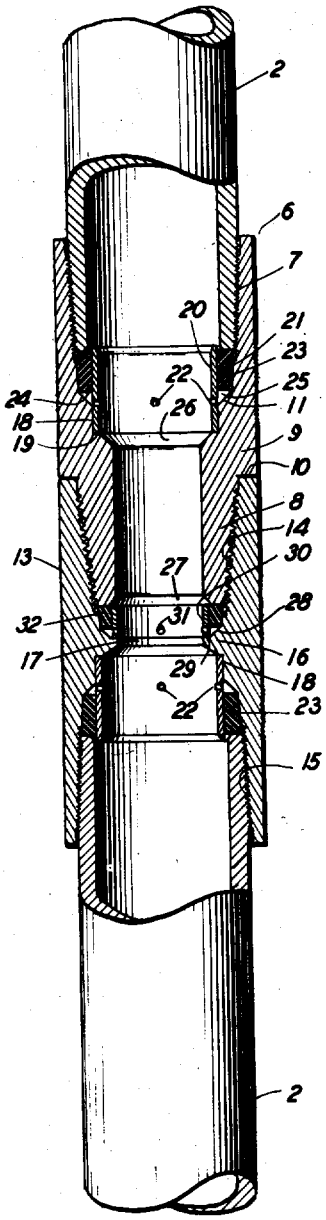
Fig. 2 is an enlarged longitudinal sectional view of one of the joints and connected sections of drill pipe.
Figure 3:
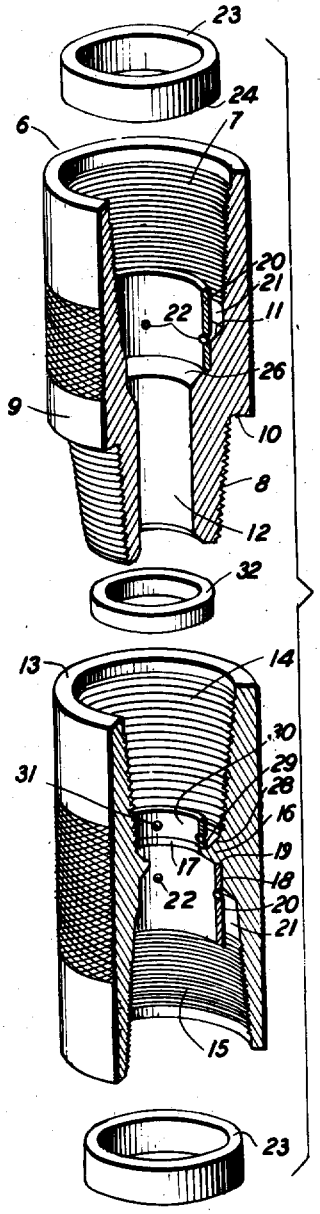
Fig. 3 is a perspective view of the tool joint members in disassembled but related condition, parts being broken away to better illustrate construction of the members.

Referring in detail to the drawing:

1 designates a well hole in process of formation with rotary drilling equipment, including drill pipe represented by the sections 2 coupled by joints 3 to form a continuous string.

4 designates metal casing lining the well hole through which drilling fluid 5, delivered to the bottom of the hole through the drill pipe, is returned to the top of the hole with cuttings made by the bit during progress of the drilling operation.

The tool joint, as ordinarily constructed, includes an upper pin member 6 having a tapered socket 7 in its upper end threaded to receive the reversely tapered, threaded end of a pipe section 2, a tapered, exteriorly threaded nipple 8 at its lower end and an intermediate collar portion 9, forming a downwardly facing, exterior shoulder 10 for abutment by the rim of the box member of the joint presently described, and an upwardly facing, interior shoulder 11, usually terminating below the threads of the socket 7 and bevelled to direct flow of fluid into the restricted channel 12 in the collar and pin portions 9 and 8.

The box member 13 includes a tapered, threaded socket 14 in its upper end for receiving the nipple 8 of the pin member 6, a larger, tapered socket 15 in its lower end for receiving the correspondingly tapered and threaded end of a lower pipe section 2 and an intermediate collar portion 16 having a throat 17 through which fluid is delivered from the nipple into the lower pipe section.

If the parts constructed as described, are without flaw and assembled accurately, they will usually confine the drilling fluid without leakage, but should the threads on the joint or pipe be imperfectly formed or have become distorted in transport or should the parts be improperly assembled, the fluid, because of the high pressures employed, will be forced from the line through the passage afforded by the imperfect connection, and particularly will this occur in the pin members where the flow is restricted by the nipples. When such a leak occurs, sand particles in the fluid grind the surfaces over which they pass, wearing away the metal and rapidly opening the outlet until such quantity of the fluid is short circuited into the return line as to seriously interfere with the drilling operation.

To prevent such leakage I provide the packing of my invention which in its preferred form includes the following elements assembled in the joint as I will now describe.

Each of the intermediate collar portions 9 and 16 of the pin and box members of the joint, and particularly the collar portion 9 of the box member, is counterbored to provide an annular seat 18 and an abutment shoulder 19 for receiving the lower end of a packing sleeve 20 driven into the seat 18 or otherwise permanently secured in the pin member, the upper end of said sleeve being extended above the bevelled shoulder 11 to form an annular recess 21, and the collar being provided with a series of fluid-seal ports 22 immediately above the shoulder 11 for affording communication between the flow channel and recess.

Mounted within the recess 21 is a packing ring 23 preferably having a lower squared face 24 to reserve an annular chamber 25 triangular in cross-section, for fluid delivered under pressure through the ports 22, thus forming a fluid seal for the joint. Additional sealing insurance is obtained through compression of the sealing ring by engagement of its upper face with the lower end of the pipe section threaded into the socket 7. The channel 12 is flared outwardly at its respective ends as indicated at 26 and 27 to reduce resistance of flow of fluid therethrough.

The sealed joint between the box member 13 and a lower pipe section is preferably obtained with identical construction as above described, and, in order to also provide a fluid seal for the joint between the nipple 8 and socket 14, the throat 17 is counter-bored to form a bevelled shoulder 28, terminating in a flat annular face 29. A relatively short packing sleeve 30, having a series of radial ports 31, is seated on the face 29 to serve as an inner retaining wall for a packing ring 32 to seal the joint through pressure of fluid entering the ports 31 and through compression of the sleeve by engagement of its upper face with the nipple 8.

A drill collar constructed as above described, may be assembled with pipe sections for operation in a well as follows:

The lower end of a pipe section is threaded into the socket of a pin member until it presses firmly against the packing. In like manner a box member is threaded onto the upper end of the pipe section. Successive pipe sections provided with pin and box members on their upper and lower ends respectively are then screw-threadedly connected together and lowered into the bore of the well. Fluid under pressure is admitted into the drill pipe, filling the chambers adjacent the packing rings through the annular series of ports, thus effecting a liquid seal at each joint of the drill collar and pipe sections and obviating any initial leakage of the fluid.

It will thus be evident that I have provided a method of and apparatus for operating a multi-pipe section or stand string of rotary drill pipe through which fluid under pressure is being circulated whereby as the stands of drill pipe are lowered one by one into the well as the depth of the well is progressively increased, tool joints with resilient packing therein are inserted between the stands of pipe. This packing is pressed into sealing position by the inserting thrust of the pipe sections. Also the packing by reason of its position and inherent characteristics, thereafter, yields back and forth in response to relative movement of the pipe sections as the string of pipe is rotating in the well so that rotary stresses are thus utilized to aid in maintaining the seal in such joint.

Furthermore, by reason of the fact that the packing ring is in each instance disposed in an enlarged bore to protect the threads in the bore from erosion, this ring in reality constitutes a filler in the enlarged bore longitudinally between the fluid passage and the tubular element threaded in the bore, whereby a relatively smooth conduction of fluid in the tool joint between the tubular element and the passage is obtained.

What I claim and desire to secure by Letters Patent is:

1. A tool joint including a socket having a shoulder at its base, a collar seated on the shoulder forming a recess between the collar and the wall of the socket, and packing in the recess spaced from the shoulder engageable by a member seated in the socket, the collar having ports communicating with the recess at the end of the packing.

2. In a rotary drilling rig including a plurality of stands of pipe, means including tool joints for connecting the stands of pipe together and sealing means in each joint arranged to be wedged into seal tight engagement with the walls of the joint by the inserting thrust of the pipe connected to the joint.

3. In a rotary drilling rig including a plurality of stands of pipe, means including tool joints for connecting the stands of pipe together and resilient sealing means in each joint arranged to be resiliently wedged into seal tight engagement with the walls of the joint by the inserting thrust of the pipe connected to the joint.

4. In a rotary drilling rig including a plurality of stands of pipe, means including tool joints for connecting the stands of pipe together, sealing means in each joint arranged to be wedged into seal tight engagement with the walls of the joint by the inserting thrust of the pipe connected to the joint, and a relatively rigid sleeve disposed in the tool joint and spaced from the wall thereof to define an annular pocket in which said sealing means is disposed.

5. A device of the character described for use with drill pipe adapted for conducting fluid under high pressure including a coupling member having a tapered socket, and a packing ring compressible against the tapered wall of the socket by thrust of a pipe section inserted into the socket to protect the coupling member against wear incident to escape of fluid between the coupling member and an inserted pipe section.

6. A device of the character described for use with drill pipe adapted for conducting fluid under high pressure including a coupling member having a tapered socket, and a packing ring slidable along the tapered wall of the socket and including a relatively rigid member for preventing inward collapse of the ring, whereby the ring may be expanded laterally outwardly in response to end thrust of a member advancing in the socket in contact with the one edge of the ring and to restraint of the ring by the wall of the socket and by said rigid member to protect the coupling member against wear incident to escape of fluid between the coupling member and said member.

7. A rotary tool joint for use with drill pipe adapted for conducting fluid under high pressure including separate joint members adapted for quick connection and disconnection and having pipe sockets, and means for sealing the joint including resilient packing in said sockets adapted to be closely pressed against walls of the joint members by inserting thrust of pipe sections.

8. A rotary tool joint for use with drill pipe adapted for conducting fluid under high pressure including separate joint members having means at their outer ends for connection with pipe sections and having pin and box portions at their respective inner ends adapted for relatively quick connection as compared with the connection of the joint members with the pipe sections, resilient packing in the box member and in the ends of both joint members adapted to be pressed to sealing relation with walls of the joint members by connecting thrust of the pin and pipe sections.

9. In a rotary well drilling aparatus including a multi-stand string of rotary drill pipe through which fluid under pressure is being circulated in the drilling of the well, coupling means for connecting the stands of pipe together and adapted to be inserted between the stands as they are lowered one by one into the well as the depth of the well progresses comprising a plurality of pipe tool joints each including resilient sealing means for forming a fluid tight joint in the joint and arranged to utilize the rotary stresses and thrust incident to the rotation of the stands of pipe in the drilling of the well for augmenting and maintaining the seal.

10. In a rotary well drilling apparatus including a multi-stand string of rotary drill pipe through which fluid under pressure is being circulated in the drilling of the well, coupling means for connecting the stands of pipe together and adapted to be inserted between the stands as they are lowered one by one into the well as the depth of the well progresses comprising a plurality of pipe tool joints each including sealing means for forming a fluid tight joint in the joint and arranged to utilize the rotary stresses and thrust incident to the rotation of the stands of pipe in the drilling of the well for augmenting and maintaining the seal, said sealing means including a flexible sealing ring concentric with the bore of the drill pipe and including means for restraining inward bulging of the ring under compression so as to concentrate any bulging of the ring in a direction tending to effectuate said seal.

11. A rotary tool joint for use with drill pipe adapted for conducting fluid under high pressure including separate joint members adapted for quick connection and disconnection and having pipe sockets, and means for sealing the joint including packing in said sockets adapted to be closely pressed against walls of the joint members by inserting thrust of pipe sections.

12. A rotary tool joint for use with drill pipe adapted for conducting fluid under high pressure including separate joint members adapted for quick connection and disconection and having pipe sockets at their outer ends, and packing in said sockets adapted to be pressed to sealing relation with walls of the sockets by thrust of pipe sections upon insertion of the pipe sections into the sockets to protect the joint against wear incident to escape of fluid between the joint members and pipe sections.

13. A rotary tool joint for use with drill pipe adapted for conducting fluid under high pressure including separate joint members having means at their outer ends for connection with pipe sections and having pin and box portions at their respective inner ends adapted for relatively quick connection as compared with the connection of the joint members with the pipe sections, packing in the box member and in the ends of both joint members adapted to be pressed to sealing relation with walls of the joint members by connecting thrust of the pin and pipe sections.

14. A rotary drill pipe joint member having a fluid passage with an enlarged bore internally threaded to receive the threaded end of a tubular element and a ring positioned within said enlarged bore to protect the threads in said bore from erosion when the joint member is in use and to provide a filler in said enlarged bore longitudinally between said fluid passage and said drill pipe end whereby a relatively smooth conduction of fluid between said tubular element and said passage is enabled.

15. A rotary drill pipe joint member having a fluid passage with an enlarged bore internally threaded to receive the threaded end of a tubular element and a ring positioned within said enlarged bore to protect the threads in said bore from erosion when the joint member is in use and to provide a filler in said enlarged bore longitudinally between said fluid passage and said drill pipe and whereby a relatively smooth conduction of fluid between said tubular element and said passage is enabled, said ring having a shoulder against which inserting thrust of said tubular element is applicable to press said ring into position.

16. A rotary drill pipe joint having a fluid passage with an enlarged bore and internally threaded at one end to receive the threaded end of a drill pipe and a ring positioned within said enlarged bore to protect the threads in said bore from erosion when the joint member is in use and to provide a filler in said enlarged bore longitudinally between said fluid passage and said drill pipe end whereby a relatively smooth conduction of fluid between the pipe and said passage is enabled.

17. A rotary drill pipe joint having a fluid passage with an enlarged bore and internally threaded at one end to receive the threaded end of a drill pipe and a ring positioned within said enlarged bore to protect the threads in said bore from erosion when the joint member is in use and to provide a filler in said enlarged bore longitudinally between said fluid passage and said drill pipe end whereby a relatively smooth conduction of fluid between the pipe and said passage is enabled, said ring having a shoulder against which inserting thrust of said pipe is applicable to press said ring inwardly into position.

FRANK J. HINDERLITER.